(12) United States Patent
Shirakami et al.

(10) Patent No.: US 12,421,179 B2
(45) Date of Patent: *Sep. 23, 2025

(54) PRODUCTION METHOD FOR RADIOLABELED ARYL COMPOUND

(71) Applicant: OSAKA UNIVERSITY, Suita (JP)

(72) Inventors: Yoshifumi Shirakami, Suita (JP); Hayato Ikeda, Suita (JP); Yasukazu Kanai, Suita (JP); Eku Shimosegawa, Suita (JP); Jun Hatazawa, Suita (JP); Tadashi Watabe, Suita (JP); Kazuko Kaneda, Suita (JP)

(73) Assignee: OSAKA UNIVERSITY, Suita (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,623

(22) Filed: Jun. 20, 2023

(65) Prior Publication Data

US 2023/0331640 A1    Oct. 19, 2023

Related U.S. Application Data

(63) Continuation of application No. 16/636,236, filed as application No. PCT/JP2018/030006 on Aug. 3, 2018, now Pat. No. 11,731,917.

(30) Foreign Application Priority Data

Aug. 4, 2017  (JP) .................. 2017-151632

(51) Int. Cl.
| | |
|---|---|
| C07B 59/00 | (2006.01) |
| C07F 5/02 | (2006.01) |
| C07F 13/00 | (2006.01) |

(52) U.S. Cl.
CPC .......... *C07B 59/001* (2013.01); *C07B 59/004* (2013.01); *C07F 5/025* (2013.01); *C07F 13/00* (2013.01); *C07F 13/005* (2013.01); *C07B 2200/05* (2013.01)

(58) Field of Classification Search
None
See application file for complete search history.

(56) References Cited

U.S. PATENT DOCUMENTS

| | | | |
|---|---|---|---|
| 4,826,672 A | 5/1989 | Milius et al. | |
| 5,077,035 A | 12/1991 | Wieland et al. | |
| 6,447,747 B1 | 9/2002 | Pirotte et al. | |
| 11,731,917 B2 | 8/2023 | Shirakami et al. | |
| 2009/0304585 A1 | 12/2009 | Zalutsky et al. | |
| 2020/0369578 A1 | 11/2020 | Shirakami et al. | |

FOREIGN PATENT DOCUMENTS

| | | |
|---|---|---|
| JP | 2001-503412 A | 3/2001 |
| JP | 2009-521469 A | 6/2009 |
| WO | WO 2007/060012 A2 | 5/2007 |
| WO | WO 2007/079953 A2 | 7/2007 |

OTHER PUBLICATIONS

Reay, Paul. Use of N-bromosuccinimide for the iodination of proteins for radioimmunoassay. Ann Clin Biochem 1982; 19; 129-133. (Year: 1982).*

Akula et al., "[$^{123}$I]Iodocognex, a Potent SPECT Agent to Map Acetylcholinesterase via a Boronic Acid Precursor," *J. Labelled Cpd. Radiopharm.*, 44(Suppl. 1): S260-S261 (2001).

Akula et al., "No-carrier-added Radioiodination of Triolborates, Water-soluble Complexes of Boronic Acids," *J. Label. Compd. Radiopharm.*, 54(3): 132-134 (2010).

Borrmann et al., "Systemic treatment with 4-$^{211}$At-phenylalanine Enhances Survival of Rats with Intracranial Glioblastoma," *Nuklearmedizin*, 52(6): 212-221 (2013).

El Refaie, "Radioiodination and Biological Evaluation of Some Drugs for Inflammatory Foci Imaging," Ph.D. Thesis, Cairo University, Egypt (2011).

Israel et al., "Improved Synthesis of No-carrier-added p-[$^{124}$I]Iodo-L-phenylalanine and p-[$^{131}$I]Iodo-L-phenylalanine for Nuclear Medicine Applications in Malignant Gliomas," *Appl. Radiat. Isot.*, 66(4): 513-522 (2008).

Kabalka et al., "Synthesis of Iodine-125 Labeled 3-Quinuclidinyl 4'-Iodobenzilate," *Nucl. Med. Biol.*, 16(4): 359-360 (1989).

(Continued)

*Primary Examiner* — James H Alstrum-Acevedo
*Assistant Examiner* — Lauren Wells
(74) *Attorney, Agent, or Firm* — Leydig, Voit & Mayer, Ltd.

(57) ABSTRACT

The invention relates to a method of producing the radiolabeled aryl compound (I) Ar—X, or a salt thereof, wherein X is $^{211}$At, $^{210}$At, $^{123}$I, $^{124}$I, $^{125}$I, or $^{131}$I. The method involves reacting the aryl boronic acid compound (II) Ar—Y, or a salt thereof, wherein Y is a borono group (—B(OH)$_2$) or an ester group thereof, with a radionuclide selected from $^{211}$At, $^{210}$At, $^{123}$I, $^{124}$I, $^{125}$I and $^{131}$I, in the presence of an oxidizing agent selected from an alkali metal iodide, an alkali metal bromide, N-bromosuccinimide, N-chlorosuccinimide and hydrogen peroxide, in water.

8 Claims, 6 Drawing Sheets

(56) References Cited

OTHER PUBLICATIONS

Kabalka et al., "No-carrier-added Radiohalogenations Utilizing Organoboranes: The Synthesis of iodine-123 Labeled Curcumin," *Journal of Organometallic Chemistry*, 694(11): 1638-1641 (2009).
Karonen, "Solid Lactoperoxidase in the Iodination of L-Tyrosine and Albumin," *Appl. Biochem. Biotechnol.*, 6(2): 119-128 (1981).
Meyer et al., "Synthesis and Analysis of 2-[211At]-L-phenylalanine and 4-[211At]-L-phenylalanine and Their Uptake in Human Glioma Cell Cultures In-Vitro," *Applied Radiation and Isotopes*, 68(6): 1060-1065 (2010).
Samnick et al., "Preparation and Investigation of Tumor Affinity, Uptake Kinetic and Transport Mechanism of Iodine-123-labelled Amino Acid Derivatives in Human Pancreatic Carcinoma and Glioblastoma Cells," *Nucl. Med. Biol.*, 28(1): 13-23 (2001).
Simon et al., "Green Chemistry Oriented Organic Synthesis in Water," *Chem. Soc. Rev.*, 41(4): 1415-1427 (2012).
Vähätalo et al., "Radioiodination Techniques for Aromatic Amino Acids—Possible Tracers for BPA," Frontiers in Neutron Capture Therapy, Kluwer Academic/Plenum Publishers, 835-838 (2001).
Wilson et al., "Radiosynthesis of SPECT Tracers via a Copper Mediated $^{123}$I-Iodination of (Hetero)Aryl Boron Reagent," *Chem. Commun.*, 52(90): 13277-13280 and Supplementary Material S1-S38 (2016).
Zhang et al., "A Highly Efficient Copper-Mediated Radioiodination Approach Using Aryl Boronic Acids," *Chem. Eur. J.*, 22(47): 16783-16786 (2016).
European Patent Office, Extended European Search Report in European Patent Application No. 18842323.0 (Feb. 18, 2021).
European Patent Office, Communication Pursuant to Article 94(3) EPC in European Patent Application No. 18842323.0 (Sep. 26, 2022).
Japanese Patent Office, International Search Report in International Patent Application No. PCT/JP2018/030006 (Sep. 11, 2018).
U.S. Appl. No. 16/636,236, filed Feb. 3, 2023.

\* cited by examiner

FIG. 1

TLC of aqueous $^{211}$At solution

FIG. 2

TLC of reaction solution (oxidizing agent: NCS)

FIG. 3

TLC of reaction solution (oxidizing agent: NBS)

FIG. 4

TLC of reaction solution (oxidizing agent: NaI)

FIG. 5

TLC of reaction solution (oxidizing agent: NaBr)

FIG. 6A

TLC of aqueous Na$^{123}$I solution

FIG. 6B

TLC of reaction solution (oxidizing agent: NBS)

FIG. 7

Cellulose acetate membrane electrophoresis of reaction solution (oxidizing agent: NBS)

FIG. 8

TLC of reaction solution (oxidizing agent: NBS)

FIG. 9

Comparison of 4-$^{211}$At-Phe and 3-$^{211}$At-Phe amount taken up by C6 glioma derived from rat

FIG. 10

SPECT imaging of C6 glioma-transplanted rat by 4-$^{211}$At-Phe (30 minutes and 3 hours after administration)

PRODUCTION METHOD FOR RADIOLABELED ARYL COMPOUND

CROSS-REFERENCE TO RELATED APPLICATIONS

This patent application is a continuation of co-pending U.S. patent application Ser. No. 16/636,236, filed Feb. 3, 2020, which is the U.S. national phase of International Patent Application No. PCT/JP2018/030006, filed on Aug. 3, 2018, which claims the benefit of Japanese Patent Application No. 2017-151632, filed Aug. 4, 2017, the disclosures of which are incorporated herein by reference in their entireties for all purposes.

TECHNICAL FIELD

The present invention relates to a production method of radiolabeled aryl compound applicable to RI internal therapy or diagnosis for cancer.

BACKGROUND ART

RI internal therapy or diagnosis for cancer by use of radionuclides that emit α-ray, β-ray, γ-ray and the like utilizes specific bindings of radionuclide-labeled drugs to target molecules, i.e., molecules specifically expressed or overexpressed in cancer cells, and it has been applied in a clinical practice. For example, $Na^{131}I$ has been applied to therapy for thyroid cancer, and $^{223}RaCl_2$ has been applied to therapy for prostate cancer bone metastasis.

Application of $^{211}At$, one of radionuclides, is expected as new RI internal therapy for cancer (e.g., 4-$^{211}$At-L-phenylalanine (Non-Patent Document 1), $Na^{211}At$, etc.). $^{211}At$ is a radionuclide produced by an accelerator such as cyclotron and the like, and has a short half-life of 7.2 hours. Therefore, a sequence of processes containing production of $^{211}At$, labelling of a drug with $^{211}At$, formulation of the drug, administration of the drug to patient with cancer, and RI internal therapy by the drug should be promptly carried out. In particular, since the labelling and the subsequent formulation should be easily carried out in a short time, the formulation is desirably carried out immediately after the labelling. Moreover, since the labeled drug is to be formulated into an injection for intravenous administration, the labeling is desirably carried out without using toxic reagent, under an organic solvent-free condition composed only of water, and the like, in terms of prompt formulation after the labelling. $^{123}I$ for diagnosis also has a short half-life of 13.23 hours, and therefore, the labelling and the subsequent formulation should be easily carried out in a short time, as is in the case in $^{211}At$.

Non-Patent Document 1 discloses that 4-$^{211}$At-L-phenylalanine can be applied to RI internal therapy for brain tumor, and a precursor, N-Boc-4-tributylstannyl-L-phenylalanine is produced in a radiochemical yield of 35-50%, by electrophilic destannylation according to a method described in Non-Patent Document 2. However, since the precursor is an N-Boc form, it cannot be dissolved in a solvent composed only of water, and use of an organic solvent for dissolution requires evaporation. In addition, the above method requires de-Boc step after the electrophilic destannylation. Moreover, Non-Patent Document 2 does not disclose specific methods for the de-Boc step, only specifically discloses labelling of 4-iodo-L-phenylalanine with $^{211}At$ by halogen exchange reaction in the presence of CuSO4, SnSO4 and an acid, at 120° C. for 60 minutes. The method requires removal of toxic Cu and Sn, and the reaction at 120° C. for 60 minutes is not an easy method in a short time. The labelling by the above-mentioned methods is not desirable, and labelling and the subsequent formulation cannot be easily carried out in a short time. Moreover, the radiochemical yield is low and most-unsatisfactory.

Non-Patent Document 3 discloses that aryl boronic acid or an ester thereof is labeled with $Na^{123}I$ by electrophilic substitution reaction in the presence of 1,10-phenanthroline and a Cu catalyst such as $Cu_2O$, $Cu(OCOCF_3)_2$ and the like, at 80° C., in water/methanol. However, the method is not desirable in terms of use of methanol and a Cu catalyst, and reaction at high temperature. In addition, the radiochemical yield is at most 87% and unsatisfactory. Moreover, the document also discloses that aryl boronic acid or an ester thereof is labeled with $Na^{123}I$ by electrophilic substitution reaction in is the presence of chliramine-T, in water/tetrahydrofuran.

However, the method is not desirable in terms of use of tetrahydrofuran, and the method cannot be applied to an electron deficient arene.

Patent Documents 1 to 4 discloses the aryl trialkyltin is labeled with $Na^{123}I$, $Na^{211}At$ and the like by electrophilic destannylation reaction. However, the reactions are not desirable because of the use of an organic solvent and toxic Sn.

DOCUMENT LIST

Patent Document

Patent Document 1: US 4826672
Patent Document 2: US 5077035
Patent Document 3: JP 2001-503412
Patent Document 4: JP 2009-521469

Non-Patent Document

Non-Patent Document 1: Nuklearmedizin, 2013, vol. 52, pp. 212-21
Non-Patent Document 2: Applied Radiation and Isotopes, 2010, vol. 68, pp. 1060-1065
Non-Patent Document 3: Chem. Commun., 2016, vol. 52, pp. 13277-13280

SUMMARY OF THE INVENTION

Problems to be Solved by the Invention

The present invention aims to produce a radiolabeled aryl compound by a method that enables an easy labelling with a high radiochemical yield in a short time, and that enables formulation immediately after the labelling.

Means of Solving the Problems

The present inventors have conducted intensive studies in an attempt to solve the above-mentioned problems and found that, by the following method, a radiolabeled aryl compound can be easily produced in a high radiochemical yield in a short time, and the formulation can be carried out immediately after the labelling, which resulted in the completion of the present invention.

Accordingly, the present invention provides the following.

[1] A method of producing a radiolabeled aryl compound represented by the formula (I):

Ar—X (I)

wherein
Ar is a $C_{6-14}$ aryl group optionally having substituent(s), and
X is $_{211}$At, $^{210}$At, $^{123}$I, $^{124}$I, $^{125}$I or $^{131}$I, or a salt thereof (hereinafter, sometimes to be referred to as radiolabeled aryl compound (I)), which comprises reacting an aryl boronic acid compound represented by the formula (II):

Ar—Y (II)

wherein
Ar is as defined above, and
Y is a borono group (—B(OH)$_2$) or an ester group thereof, or a salt thereof (hereinafter, sometimes to be referred to as radiolabeled aryl compound (II)), with a radionuclide selected from $^{211}$At, $^{210}$At, $^{123}$I, $^{124}$I, $^{125}$I and $^{131}$I, in the presence of an oxidizing agent selected from an alkali metal iodide, an alkali metal bromide, N-bromosuccinimide, N-chlorosuccinimide is and hydrogen peroxide, in water.

[2] The method according to the above-mentioned [1], wherein the reaction is carried out in an organic solvent-free system.

[3] The method according to the above-mentioned [1] or [2], wherein the reaction is carried out at room temperature.

[4] The method according to any of the above-mentioned [1] to [3], wherein the radionuclide is $^{211}$At or $^{210}$At, and the oxidizing agent is selected from sodium iodide, sodium bromide, N-bromosuccinimide, N-chlorosuccinimide and hydrogen peroxide.

[5] The method according to any of the above-mentioned [1] to [3], wherein the radionuclide is $^{123}$I, $^{124}$I, $^{125}$I or $^{131}$I, and the oxidizing agent is selected from N-bromosuccinimide and N-chlorosuccinimide.

[6] The method according to any of the above-mentioned [1] to [5], wherein Y is a borono group (—B(OH)$_2$).

[7] The method according to any of the above-mentioned [1] to [6], wherein the substituent of the $C_{6-14}$ aryl group optionally having substituent(s) represented by Ar is a group capable of binding specifically to a target molecule.

[8] The method according to the above-mentioned [7], wherein the target molecule is an antigen, a transporter, a receptor, an enzyme or a gene, which is specifically expressed or overexpressed in a cancer cell.

[9] The method according to any of the above-mentioned [1] to [8], wherein Ar is
a group represented by the formula:

wherein
$R^2$ is a halogen atom,
m is 0 or 1,
n is 0 or an integer of 1 to 4, and
* is a binding site to X or Y, or
a group derived from a peptide having a partial structure represented by the formula:

wherein
$R^2$ is a halogen atom,
m is 0 or 1,
n is 0 or an integer of 1 to 4, and
* is a binding site to X or Y.

[10] The method according to any of the above-mentioned [1] to [8], wherein Ar is
a group represented by the formula:

wherein
$R^3$ is a hydrogen atom or a halogen atom,
m is 0 or 1, and
* is a binding site to X or Y, or
a group derived from a peptide having a partial structure is represented by the formula:

wherein
$R^3$ is a hydrogen atom or a halogen atom,
m is 0 or 1, and
* is a binding site to X or Y.

[11] The method according to any of the above-mentioned [1] to [8], wherein the aryl boronic acid compound represented by the formula (II) is 4-boronophenylalanine, 4-borono-2-fluorophenylalanine or 3-boronophenylalanine, and the radiolabeled aryl compound represented by the formula (I) is 4-astato ($^{211}$At) phenylalanine, 4-astato ($^{211}$At)-2-fluorophenylalanine or 3-astato($^{211}$At)phenylalanine. [12] 3-Astato($^{211}$At) phenylalanine or a salt thereof.

Effect of the Invention

According to the production method of the present invention, the radiolabeled aryl compound (I) can be easily produced in a high radiochemical yield in a short time, and is the formulation can be carried out immediately after the labelling. Therefore, the labelling and formulation can be easily carried out in a short time, and a sequence of processes from preparation of a radionuclide to RI internal therapy or diagnosis for cancer can be promptly carried out.

DESCRIPTION OF EMBODIMENTS

The present invention is explained in detail in the following.

In the present specification, examples of the "$C_{6-14}$ aryl group" include phenyl, 1-naphthyl, 2-naphthyl, 1-anthryl, 2-anthryl and 9-anthryl.

In the present specification, examples of the "halogen atom" include a fluorine atom, a chlorine atom, a bromine atom and an iodine atom.

In the present specification, examples of the "$C_{1-6}$ alkyl group" include methyl, ethyl, propyl, isopropyl, butyl, isobutyl, sec-butyl, tert-butyl, pentyl, isopentyl, neo-pentyl, 1-ethylpropyl, hexyl, isohexyl, 1,1-dimethylbutyl, 2,2-dimethylbutyl, 3,3-dimethylbutyl and 2-ethylbutyl.

Each symbol in the formulas (I) and (II) is explained below.

In the formulas (I) and (II), Ar is a $C_{6-14}$ aryl group optionally having substituent(s).

The "$C_{6-14}$ aryl group" of the "$C_{6-14}$ aryl group optionally having substituent(s)" represented by Ar is preferably phenyl. Examples of the "substituent" of the "$C_{6-14}$ aryl group optionally having substituent(s)" represented by Ar include groups capable of binding specifically to a target molecule. Examples of the target molecule include antigens, transporters, receptors, enzymes, genes and the like, which is are specifically expressed or overexpressed in cancer cells. Specific examples of such "substituent" include $C_{1-6}$ alkyl groups (preferably methyl, ethyl) substituted by a carboxy group and an amino group; a carboxy group; an amino group; a guanidino group; groups having a tropane skeleton; fatty-acid residues (groups obtained by removing any one hydrogen atom from fatty-acids); residues of biologically related substances such as peptides, proteins, antibodies, nucleic acids and the like (groups obtained by removing any one hydrogen atom from biologically related substances); and the like.

Ar is preferably a $C_{6-14}$ aryl group having substituent(s), more preferably a phenyl group having substituent(s), still more preferably a residue derived from an amino acid having phenyl group(s), or a residue derived from a peptide having phenyl group(s).

As used herein, the above-mentioned "residue derived from an amino acid having phenyl group(s)" means a group obtained by removing, from an amino acid having phenyl group(s) (e.g., phenylalanine or phenylglycine optionally substituted by halogen atom(s), etc.), any one hydrogen atom on the phenyl ring.

Preferable example is a group represented by the formula:

wherein
$R^2$ is a halogen atom,
m is 0 or 1,
n is 0 or an integer of 1 to 4, and
* is a binding site to X or Y.

More preferable example is a group represented by the formula:

wherein
$R^3$ is a hydrogen atom or a halogen atom,
m is 0 or 1, and
* is a binding site to X or Y.

In another embodiment, more preferable example is a group represented by the formula:

or wherein
R³ is a hydrogen atom or a halogen atom,
m is 0 or 1, and
* is a binding site to X or Y.

The above-mentioned "residue derived from a peptide having phenyl group(s)" means a group obtained by removing, from a peptide having phenyl group(s) (e.g., a peptide containing phenylalanine or phenylglycine optionally substituted by halogen atom(s), etc.), any one hydrogen atom on the phenyl ring.

Preferable example is a group derived from a peptide having a partial structure represented by the formula:

wherein
R² is a halogen atom,
m is 0 or 1,
n is 0 or an integer of 1 to 4, and
* is a binding site to X or Y.

More preferable example is a group derived from a peptide having a partial structure represented by the formula:

wherein
R³ is a hydrogen atom or a halogen atom,
m is 0 or 1, and
* is a binding site to X or Y.

In another embodiment, more preferable example is a group derived from a peptide having a partial structure represented by the formula:

or wherein
R³ is a hydrogen atom or a halogen atom,
m is 0 or 1, and
* is a binding site to X or Y.

The "halogen atom" represented by R² or R³ is preferably a fluorine atom.

R² is preferably a fluorine atom.
n is preferably 0 or 1.
R³ is preferably a hydrogen atom or a fluorine atom.
m is preferably 1.

In the formula (II), Y is a borono group (—B(OH)$_2$) or an ester group thereof.

Examples of the "ester group of borono group" represented by Y include the following ester groups.

wherein R$^1$ is a C$_{1-6}$ alkyl group,

Y is preferably a borono group (—B(OH)$_2$).

In the formula (I), X is a radionuclide $^{211}$At, $^{210}$At, $^{123}$I, $^{124}$I, $^{125}$I or $^{131}$I.

When the radiolabeled aryl compound (I) or aryl boronic acid compound (II) is in the form of a salt, examples of such salts include metal salts (e.g., alkali metal salts such as sodium salt, potassium salt etc.; alkaline-earth metal salts such as calcium salt, magnesium salt, barium salt etc.), an ammonium salt, salts with an organic base (e.g., trimethylamine, triethylamine, pyridine, picoline, 2,6-lutidine), salts with an inorganic acid (e.g., hydrochloric acid, hydrobromic acid, nitric acid, sulfuric acid), salts with an organic acid (e.g., formic acid, acetic acid, trifluoroacetic acid, phthalic acid, fumaric acid, oxalic acid, tartaric acid, maleic acid, citric acid, succinic acid, malic acid), and the like.

In the present invention, the radiolabeled aryl compound (I) is produced by reacting the aryl boronic acid compound (II) with a radionuclide selected from $^{211}$At, $^{210}$At, $^{123}$I, $^{124}$I, $^{125}$I and $^{131}$I in the presence of an oxidizing agent selected from an alkali metal iodide, an alkali metal bromide, N-bromosuccinimide, N-chlorosuccinimide and hydrogen peroxide, in water.

The aryl boronic acid compound (II) is preferably an is amino acid having a borono-substituted phenyl group(s), or a peptide containing the amino acid, more preferably an amino acid having a borono-substituted phenyl group(s). The borono-substituted phenyl group optionally has additional substituent(s) such as a halogen and the like.

The aryl boronic acid compound (II) is more preferably 4-boronophenylalanine, 4-borono-2-fluorophenylalanine, 4-boronophenylglycine or 4-borono-2-fluorophenylglycine, particularly preferably 4-boronophenylalanine or 4-borono-2-fluorophenylalanine.

In another embodiment, the aryl boronic acid compound (II) is more preferably 4-boronophenylalanine, 4-borono-2-fluorophenylalanine, 4-boronophenylglycine, 4-borono-2-fluorophenylglycine, 3-boronophenylalanine or 3-boronophenylglycine, particularly preferably 4-boronophenylalanine, 4-borono-2-fluorophenylalanine or 3-boronophenylalanine.

The aryl boronic acid compound (II) is not limited to the compounds exemplified above, and the radiolabelling method of aryl compound of the present invention can also be applied to various aryl boronic acid compounds, for example, boronohydroxybenzene and boronocarboxybenzene (carboxyphenylboronic acid).

When the aryl boronic acid compound (II) is the above-mentioned amino acid having a borono-substituted phenyl group(s), it is used generally in the form of an aqueous solution, preferably in the form of a solution dissolved in an aqueous alkali solution such as an aqueous sodium hydrogencarbonate solution and the like.

Examples of the alkali metal iodide include sodium iodide, potassium iodide and the like. Among them, preferred is sodium iodide.

Examples of the alkali metal bromide include sodium bromide, potassium bromide and the like. Among them, preferred is sodium bromide.

The combination of the radionuclide and the oxidizing agent is preferably
(1) a combination of the radionuclide of $^{211}$At or $^{210}$At, and the oxidizing agent selected from sodium iodide, sodium bromide, N-bromosuccinimide, N-chlorosuccinimide and hydrogen peroxide; or
(2) a combination of the radionuclide of $^{123}$I, $^{124}$I, $^{125}$I or $^{131}$I, and the oxidizing agent selected from N-bromosuccinimide and N-chlorosuccinimide. The oxidizing agent may be used alone or in combination of two or more kinds thereof. The oxidizing agent is used generally in the form of an aqueous solution.

The oxidizing agent is used in an amount sufficient to oxidize the radionuclide, generally in a large excess amount relative to the radionuclide. It is used preferably in a concentration of 0.0001 to 0.2 mol/L, more preferably in a concentration of 0.001 to 0.1 mol/L, in terms of reaction efficiency and economic efficiency.

The radionuclide is used in the reaction generally in the form of an aqueous solution, preferably in the form of a solution prepared by dissolving in an aqueous alkali solution such as an aqueous sodium hydrogencarbonate solution and the like, in terms of stability.

In cases where the radionuclide is $^{211}$At, first, bismuth is irradiated with helium particles accelerated to 28 MeV by cyclotron, and $^{211}$At is generated by the resulting $^{209}$Bi($\alpha$,2n)$^{211}$At nuclear reaction. Next, by heating, the target substance $^{209}$Bi is melted, but the $^{211}$At is vaporized, and then the vaporized $^{211}$At is trapped in liquid nitrogen, and dissolved in water to prepare an $^{211}$At undiluted solution. Then, for the purpose of stabilization of $^{211}$At, an aqueous alkali solution such as an aqueous sodium hydrogencarbonate solution and the like is added to the undiluted solution to prepare an aqueous $^{211}$At alkali solution.

In cases where the radionuclide is $^{210}$At, first, bismuth is irradiated with helium particles accelerated to 29 MeV or more by cyclotron, and $^{210}$At is generated by the resulting $^{209}$Bi($\alpha$,3n)$^{210}$At nuclear reaction. Next, by the same procedure mentioned above, an aqueous $^{210}$At solution is prepared.

In cases where the radionuclide is $^{123}$I, it is available as an aqueous Na$^{123}$I solution.

In cases where the radionuclide is $^{124}$I, first, tellurium is irradiated with proton particles accelerated by cyclotron, and $^{124}$I is generated by the resulting $^{124}$Te(p,n)$^{124}$I nuclear reaction. Next, the target substance $^{124}$Te is melted, and the remaining $^{124}$I is dissolved in an aqueous sodium hydroxide solution to prepare an aqueous $^{124}$I sodium hydroxide solution.

In cases where the radionuclide is $^{125}$I, it is available as an aqueous Na$^{125}$I solution.

In cases where the radionuclide is $^{131}$I, it is available as an aqueous Na$^{131}$I solution.

Since $^{211}$At has a short half-life of 7.2 hours, $^{210}$At has a short half-life of 8.3 hours, and $^{123}$I has a short half-life of 13.2 hours, these radionuclides should be used in the subsequent reaction immediately after the preparation. While $^{124}$I has a relatively long half-life of 4.2 days, $^{125}$I has a relatively long half-life of 59.4 days, and $^{131}$I has a relatively long half-life of 8.04 days, these radionuclides is are also preferably used in the subsequent reaction immediately after the preparation.

The aryl boronic acid compound (II) is used generally in a large excess amount relative to the radionuclide, preferably in a concentration of 0.0001 mol/l to 0.5 mol/l, more preferably in a concentration of 0.001 mol/l to 0.2 mol/l, per 1 Bq to 1,000 GBq of the radionuclide, in terms of reaction efficiency and economic efficiency.

The above-mentioned reaction is carried out by mixing the aryl boronic acid compound (II), an oxidizing agent and a radionuclide, and the mixing order is not particularly limited. The reaction is preferably carried out by adding an aqueous radionuclide alkali solution and an aqueous oxidizing agent solution, in this order, to an aqueous solution (preferably an aqueous sodium hydrogencarbonate solution) of the aryl boronic acid compound (II), or by adding an aqueous oxidizing agent solution and an aqueous radionuclide alkali solution, in this order, to an aqueous solution (preferably an aqueous sodium hydrogencarbonate solution) of the aryl boronic acid compound (II), more preferably by adding an aqueous radionuclide alkali solution and an aqueous oxidizing agent solution, in this order, to an aqueous solution (preferably an aqueous sodium hydrogencarbonate solution) of the aryl boronic acid compound (II).

The above-mentioned reaction is carried out in water, i.e., in an organic solvent-free system.

The above-mentioned reaction is carried out at room temperature, specifically at 0° C.-40° C., preferably 10° C.-35° C. In the production method of the present invention, the reaction proceeds rapidly in a short time, even at room temperature. For example, the reaction is completed for 1 is minute to 3 hours, particularly 1 minute to 30 minutes.

The completion of the reaction is confirmed by thin layer chromatography (TLC) analysis, based on the disappearance of a free radionuclide.

In the production method of the present invention, the radiolabeled aryl compound (I) can be obtained in a high radiochemical yield of 75% or more, particularly 80% or more, especially 90% or more.

Since the reaction solution contains neither an organic solvent nor a toxic reagent, the reaction solution can be formulated into an injection and the like immediately after the completion of the reaction, without isolation of the radiolabeled aryl compound (I).

As explained above, in the production method of the present invention, the labeling can be easily carried out in a high radiochemical yield in a short time, without use of an organic solvent and a toxic reagent. Therefore, a sequence of processes from preparation of a radionuclide to RI internal therapy or diagnosis for cancer can be promptly carried out.

The radiolabeled aryl compound (I) produced by such method is preferably
4-astato($^{211}$At)phenylalanine,
3-astato($^{211}$At)phenylalanine,
4-astato($^{211}$At)-2-fluorophenylalanine,
4-astato($^{210}$At))phenylalanine,
3-astato($^{210}$At)phenylalanine,
4-astato($^{210}$At)-2-fluorophenylalanine,
4-iodo($^{123}$I)phenylalanine,
3-iodo($^{123}$I)phenylalanine,
4-iodo($^{123}$I)-2-fluorophenylalanine,
4-iodo($^{124}$I)phenylalanine,
3-iodo($^{124}$I)phenylalanine,
4-iodo($^{124}$I)-2-fluorophenylalanine,
4-iodo($^{125}$I)phenylalanine,
3-iodo($^{125}$I)phenylalanine,
4-iodo($^{125}$I)-2-fluorophenylalanine,
4-iodo($^{131}$I)phenylalanine,
3-iodo($^{131}$I)phenylalanine,
4-iodo($^{131}$I)-2-fluorophenylalanine,
4-astato($^{211}$At)phenylglycine,
3-astato($^{211}$At)phenylglycine,
4-astato($^{211}$At)-2-fluorophenylglycine,
4-astato($^{210}$At))phenylglycine,
3-astato($^{210}$At))phenylglycine,
4-astato($^{210}$At)-2-fluorophenylglycine,
4-iodo($^{123}$I)phenylglycine,
3-iodo($^{123}$I)phenylglycine,
4-iodo($^{123}$I)-2-fluorophenylglycine,
4-iodo($^{124}$I)phenylglycine,
3-iodo($^{124}$I)phenylglycine,
4-iodo($^{124}$I)-2-fluorophenylglycine,
4-iodo($^{125}$I)phenylglycine,
3-iodo($^{125}$I)phenylglycine,
4-iodo($^{125}$I)-2-fluorophenylglycine,
4-iodo($^{131}$I)phenylglycine,
3-iodo($^{131}$I)phenylglycine, or
4-iodo($^{131}$I)-2-fluorophenylglycine, more preferably
4-astato($^{211}$At)phenylalanine,
3-astato($^{211}$At)phenylalanine,
4-astato($^{211}$At)-2-fluorophenylalanine,
4-astato($^{210}$At))phenylalanine,
3-astato($^{210}$At))phenylalanine,
4-astato($^{210}$At)-2-fluorophenylalanine,
4-iodo($^{123}$I)phenylalanine,
3-iodo($^{123}$I)phenylalanine,
4-iodo($^{123}$I)-2-fluorophenylalanine,
4-iodo($^{124}$I)phenylalanine,
3-iodo($^{124}$I)phenylalanine,
4-iodo($^{124}$I)-2-fluorophenylalanine,
4-iodo($^{125}$I)phenylalanine,
3-iodo($^{125}$I)phenylalanine,
4-iodo($^{125}$I)-2-fluorophenylalanine,
4-iodo($^{132}$I)phenylalanine,
3-iodo($^{131}$I)phenylalanine, or
4-iodo($^{131}$I)-2-fluorophenylalanine,
particularly preferably
4-astato($^{211}$At)phenylalanine,
3-astato($^{211}$At)phenylalanine, or
4-astato($^{211}$At)-2-fluorophenylalanine.

Among the radiolabeled aryl compound (I), 3-astato($^{211}$At)phenylalanine is a novel compound. The compound is taken up in large amounts by cancer cells, and therefore, it is particularly expected to be applied to RI internal therapy for cancer.

EXAMPLES

The present invention is explained in detail by referring to the following Examples, which are not to be construed as limitative, and the invention may be changed within the scope of the present invention.

In the following Examples and Reference Examples, the radiochemical yield is calculated by the following formula.
radiochemical yield (%)=(radioactivity of the desired compound on thin-layer plate or electrophoretic membrane/total radioactivity on thin-layer plate or electrophoretic membrane)×100

The thin-layer plate and electrophoretic membrane was exposed on BAS imaging plate (GE Healthcare), and the BAS imaging plate was analyzed by an image analyzer (Tyhoon FLA7000, GE Healthcare). The data processing was performed using ImageQuantTL Analysis Toolbox (GE Healthcare).

Figure 1:
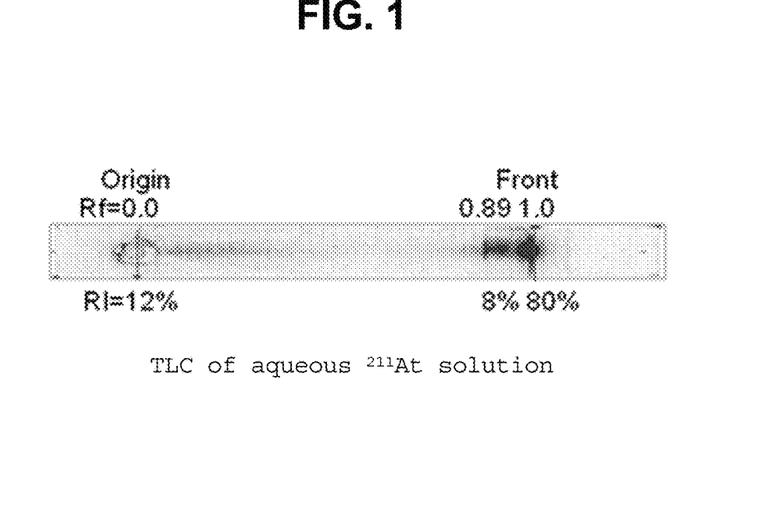
FIG. 1 shows a thin layer chromatography (TLC) of the aqueous $^{211}$At solution prepared in Reference Example 1.

Reference Example 1 Preparation of an aqueous $^{211}$At solution $^{211}$At was generated by $^{209}$Bi ($\alpha$,2n)$^{211}$At nuclear reaction, irradiating bismuth with helium particles accelerated (28 MeV) by cyclotron. After the irradiation, by heating, the target substance $^{209}$Bi was melted, but the $^{211}$At was vaporized, and then the vaporized $^{211}$At was trapped in liquid nitrogen, and dissolved in a small amount of water to give an $^{211}$At undiluted solution. To the obtained $^{211}$At undiluted solution was added a 7% aqueous sodium hydrogencarbonate solution to prepare an aqueous $^{211}$At solution having a radioactive concentration of about 5 MBq/ml (immediately after the production). The thin layer chromatography (TLC) of the aqueous $^{211}$At solution are shown in FIG. 1 (thin-layer plate: G60 (Merck), developing solvent: ACN:water:TFA (66:33:1)). The spots of $^{211}$At were detected on Rf=1.0 (80%) and 0.89 (8%).

Example 1 Synthesis of 4-$^{211}$At-L-phenylalanine (Oxidizing Agent: NCS)

Figure 2:
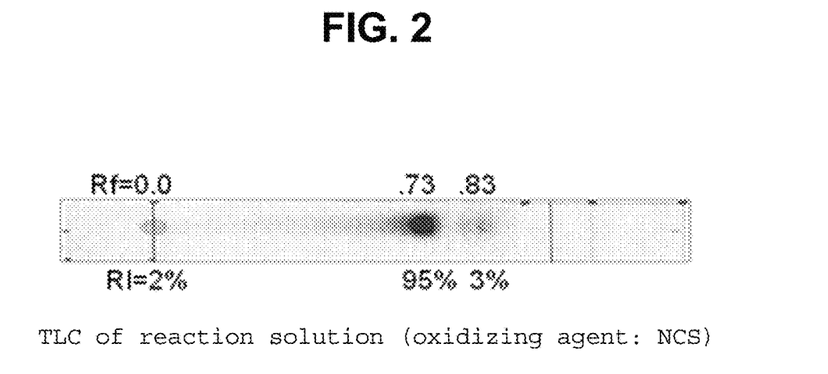
FIG. 2 shows a thin layer chromatography (TLC) of the reaction solution of Example 1.

4-Borono-L-phenylalanine (Bpa) was dissolved in a 7% aqueous sodium hydrogencarbonate solution to prepared a 10 mg/ml of solution. The solution (0.2 ml) was put into a small glass vial, and the aqueous $^{211}$At solution (5 MBq/ml, 0.2 ml) prepared in Reference Example 1 was added thereto, and then an aqueous N-chlorosuccinimide (NCS) solution (4 mg/ml, 0.04 ml) was slowly added dropwise thereto at room temperature. After 30 minutes, the reaction solution was analyzed by thin layer chromatography (TLC) (thin-layer plate: G60 (Merck), is developing solvent: ACN:water:TFA (66:33:1)) (FIG. 2). The radiochemical yield of 4-$^{211}$At-L-phenylalanine (Rf=0.73) was 95%.

Example 2 Synthesis of 4-$^{211}$At-L-phenylalanine (Oxidizing Agent: NBS)

Figure 3:
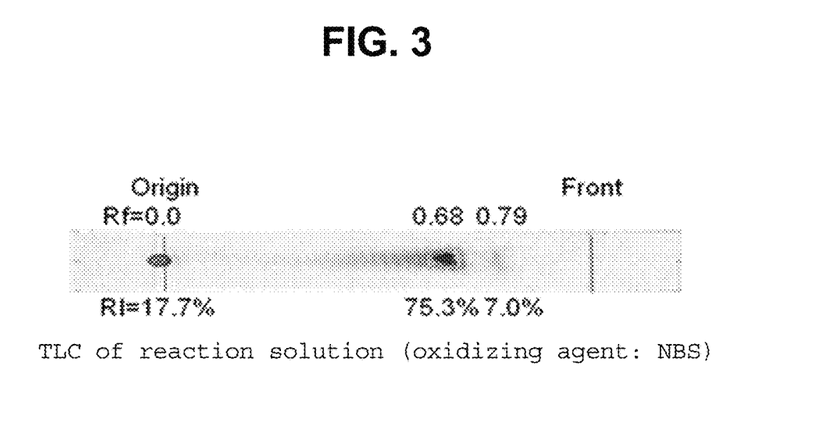
FIG. 3 shows a thin layer chromatography (TLC) of the reaction solution of Example 2.

4-Borono-L-phenylalanine (Bpa) was dissolved in a 7% aqueous sodium hydrogencarbonate solution to prepared a 10 mg/ml of solution. The solution (0.2 ml) was put into a small glass vial, and the aqueous $^{211}$At solution (5 MBq/ml, 0.2 ml) prepared in Reference Example 1 was added thereto, and then an aqueous N-bromosuccinimide (NBS) solution (4 mg/ml, 0.04 ml) was slowly added dropwise thereto at room temperature. After minutes, the reaction solution was analyzed by thin layer chromatography (TLC) (thin-layer plate: G60 (Merck), developing solvent: ACN:water:TFA (66:33:1)) (FIG. 3). The radiochemical yield of 4-$^{211}$At-L-phenylalanine (Rf=0.68) was 75.3%.

Example 3 Synthesis of 4-$^{211}$At-L-phenylalanine (Oxidizing Agent: NaI)

Figure 4:
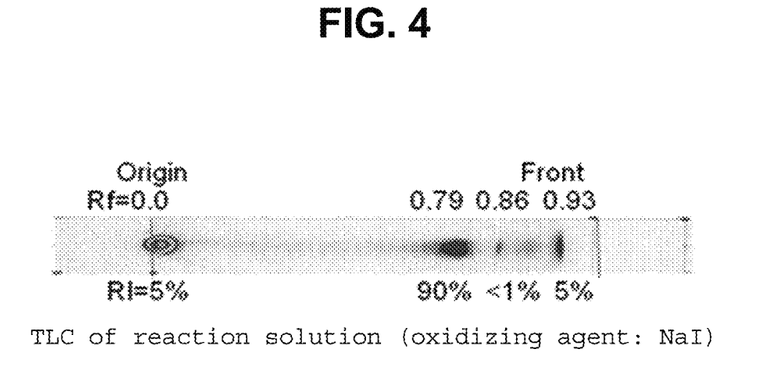
FIG. 4 shows a thin layer chromatography (TLC) of the reaction solution of Example 3.

4-Borono-L-phenylalanine (Bpa) was dissolved in a 7% aqueous sodium hydrogencarbonate solution to prepared a 10 mg/ml of solution. The solution (0.2 ml) was put into a small glass vial, and the aqueous $^{211}$At solution (5 MBq/ml, 0.2 ml) prepared in Reference Example 1 was added thereto, and then an aqueous sodium iodide (NaI) solution (10 mg/ml, 0.1 ml) was slowly added dropwise thereto at room temperature. After 30 minutes, the reaction solution was analyzed by thin layer chromatography (TLC) (thin-layer plate: G60 (Merck), developing solvent: ACN:water:TFA (66:33:1)) (FIG. 4). The radiochemical yield of 4-$^{211}$At-L-phenylalanine (Rf=0.79) was 90%.

Example 4 Synthesis of 4-$^{211}$At-L-phenylalanine (Oxidizing Agent: NaBr)

Figure 5:
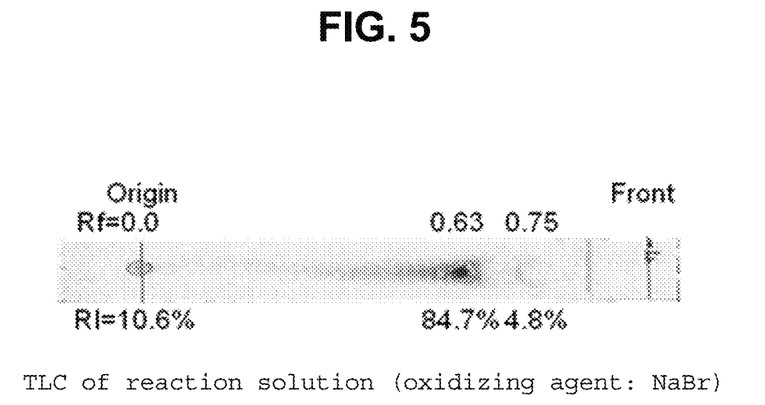
FIG. 5 shows a thin layer chromatography (TLC) of the reaction solution of Example 4.

4-Borono-L-phenylalanine (Bpa) was dissolved in a 7% aqueous sodium hydrogencarbonate solution to prepared a 10 mg/ml of solution. The solution (0.2 ml) was put into a small glass vial, and the aqueous $^{211}$At solution (5 MBq/ml, 0.2 ml) prepared in Reference Example 1 was added thereto, and then an aqueous sodium bromide (NaBr) solution (10 mg/ml, 0.1 ml) was slowly added dropwise thereto at room temperature. After 30 minutes, the reaction solution was analyzed by thin layer chromatography (TLC) (thin-layer plate: G60 (Merck), developing solvent: ACN:water:TFA (66:33:1)) (FIG. 5). The radiochemical yield of 4-$^{211}$At-L-phenylalanine (Rf=0.63) was 84.7%.

Example 5 Synthesis of 4-$^{123}$I-L-phenylalanine (Oxidizing Agent: NBS)

Figure 6A:
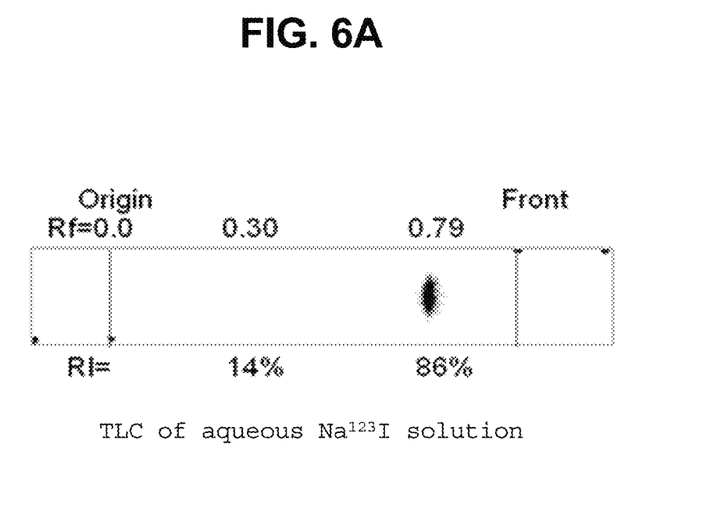
FIG. 6A shows a thin layer chromatography (TLC) of the aqueous Na$^{123}$I solution.
Figure 6B:
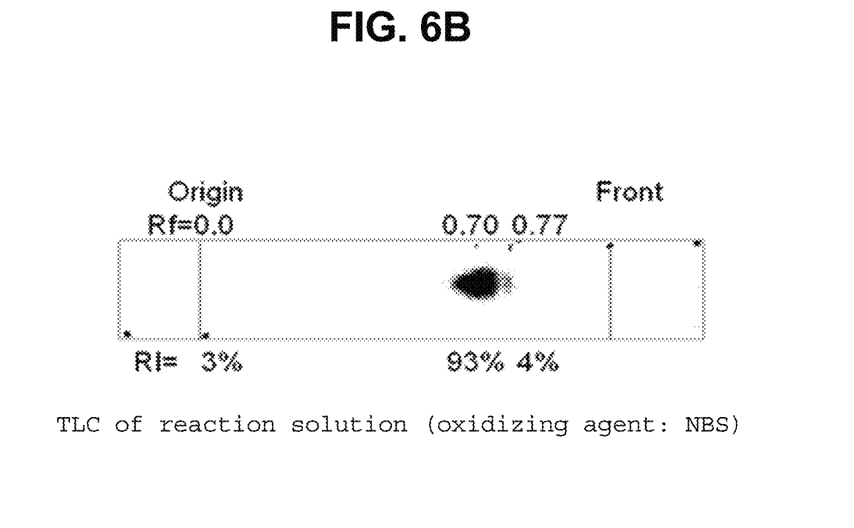
FIG. 6B shows a thin layer chromatography (TLC) of the reaction solution of Example 5.

4-Borono-L-phenylalanine (Bpa) was dissolved in a 7% aqueous sodium hydrogencarbonate solution to prepared a 10 mg/ml of solution. The solution (0.2 ml) was put into a small glass vial, and an aqueous Na$^{123}$I solution (74 MBq/ml, 5 mmol/l aqueous NaOH solution, 0.2 ml) was added thereto, and then an aqueous N-bromosuccinimide (NBS) solution (4 mg/ml, 0.04 ml) was slowly added dropwise thereto at room temperature. After 30 minutes, the reaction solution was analyzed by thin layer chromatography (TLC) (thin-layer plate: G60 (Merck), developing solvent: ACN:water:TFA (66:33:1)) (FIG. 6B). The radiochemical yield of 4-$^{123}$I-L-phenylalanine (Rf=0.70) was 93%. The thin layer chromatography (TLC) (thin-layer plate: G60 (Merck), developing solvent: ACN:water:TFA (66:33:1)) of the aqueous Na$^{123}$I solution is shown in FIG. 6A.

Reference Example 2 Synthesis of 4-iodo-L-phenylalanine Using Non-Radioactive Iodine 4-Borono-L-phenylalanine (Bpa) was dissolved in a 7% aqueous sodium hydrogencarbonate solution to prepared a 10 mg/ml of solution. The solution (0.3 ml) was put into a small glass vial, and an aqueous NaI solution (10 mg/ml, 0.3 ml) was added thereto, and then an aqueous N-bromosuccinimide (NBS) solution (10 mg/ml, 0.3 ml) was slowly added dropwise thereto at room temperature. After 30 minutes, the reaction solution was analyzed by thin layer chromatography (TLC) (thin-layer plate: G60 (Merck), developing solvent: ACN:water:TFA (66:33:1)), and the single spot was detected on Rf=0.7 (ultraviolet radiation and coloration in iodine bath). Then, the reaction solution was 1000 fold-diluted with water, and analyzed by LC-MS for amino acid analysis, compared to commercially available 4-iodo-L-phenylalanine as a control sample. The product was detected at the same retention time as in the control sample 4-iodo-L-phenylalanine, and the extraction mass was also the same as that of the control sample (theoretical mass=290.9756, extraction mass=291.9835). The purity of the product was 98.9%. The impurity was L-phenylalanine (1.1%) alone, and 4-bromo-L-phenylalanine and the like were not detected.

Example 6 Synthesis of 4-$^{211}$At-2-fluoro-L-phenylalanine (Oxidizing Agent: NBS)

Figure 7:
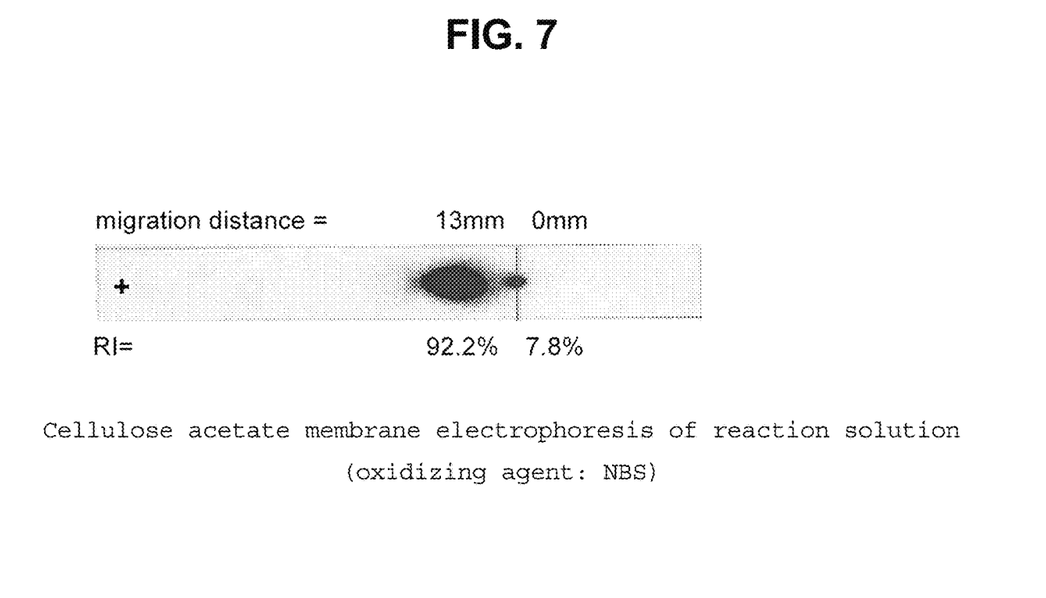
FIG. 7 shows a cellulose acetate membrane electrophoresis of the reaction solution of Example 6.

4-Borono-2-fluoro-L-phenylalanine (FBpa) was dissolved in a 7% aqueous sodium hydrogencarbonate solution to prepared a 5 mg/ml of solution. The solution (0.2 ml) was put into a small glass vial, and the aqueous $^{211}$At solution (5 MBq/ml, 0.1 ml) prepared in Reference Example 1 was added thereto, and then an aqueous N-bromosuccinimide (NBS) solution (4 mg/ml, 0.04 ml) was slowly added dropwise thereto at room temperature. After 15 minutes, the reaction solution was analyzed by cellulose acetate membrane electrophoresis method (FIG. 7). The radiochemical yield of 4-$^{211}$At-2-fluoro-L-phenylalanine (Rf=0.68) was 92.2%.

Example 7 Synthesis of 3-$^{211}$At-D,L-phenylalanine

Figure 8:
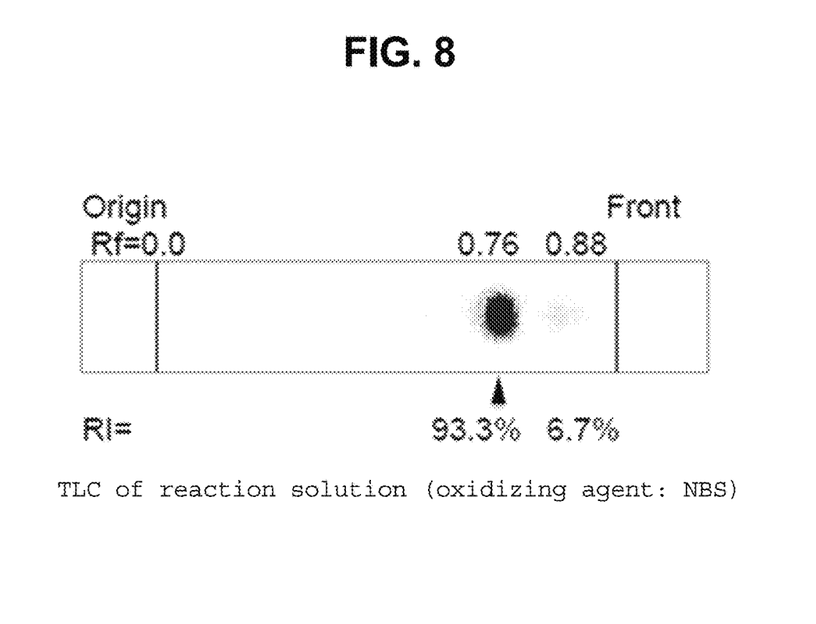
FIG. 8 shows a thin layer chromatography (TLC) of the reaction solution of Example 7.

3-Borono-D,L-phenylalanine (3-Bpa) was dissolved in a 1.4% aqueous sodium hydrogencarbonate solution to prepared a 10 mg/ml of solution. The solution (0.2 ml) was put into a small glass vial, and the aqueous $^{211}$At solution (5 MBq/ml, 0.2 ml) prepared in Reference Example 1 was added thereto, and then an aqueous N-bromosuccinimide (NBS) solution (4 mg/ml, 0.04 ml) was slowly added dropwise thereto at room temperature. After 30 minutes, the reaction solution was analyzed by thin layer chromatography (TLC) (thin-layer plate: silica gel G60 (Merck), developing solvent: ACN:water:TFA (66:33:1)) (FIG. 8). The radiochemical yield of the produced 3-$^{211}$At-D,L-phenylalanine (Rf=0.76) was 93.3%.

Example 8 1-$^{211}$At-2-hydroxybenzene

2-Boronohydroxybenzene was dissolved in a 7% aqueous sodium hydrogencarbonate solution to prepared an aqueous solution having a concentration of 5 mg/ml. The aqueous solution was put into a small glass vial, and the aqueous $^{211}$At solution (5 MBq/ml, 0.2 ml) prepared in Reference Example 1 was added thereto, and then an aqueous N-bromosuccinimide (NBS) solution (4 mg/ml, 0.04 ml) was slowly added dropwise thereto at room temperature. After 30 minutes, an aqueous ascorbic acid solution (3 mg/ml, 0.03 ml) was added to the reaction solution to quench the reaction. The reaction is solution was analyzed by thin layer chromatography (TLC) (thin-layer plate: silica gel G60 (Merck), developing solvent: ACN:water:TFA (66:33:1)). The radiochemical yield of the produced 1-$^{211}$At-2-hydroxybenzene (Rf=0.91) was 98.1%. This result demonstrates that the method of radiolabelling an aryl compound of the present invention can be applied not only to boronophenylalanine but also to boronohydroxybenzene.

Example 9 1-$^{211}$At-4-carboxybenzene

4-Barboxyphenylboronic acid was dissolved in a 7% aqueous sodium hydrogencarbonate solution to prepared an aqueous solution having a concentration of 16 mg/ml. The aqueous solution was put into a small glass vial, and the aqueous $^{211}$At solution (5 MBq/ml, 0.2 ml) prepared in Reference Example 1 was added thereto, and then an aqueous N-bromosuccinimide (NBS) solution (4 mg/ml, 0.04 ml) was slowly added dropwise thereto at room temperature. After 30 minutes, an aqueous ascorbic acid solution (3 mg/ml, 0.03 ml) was added to the reaction solution to quench the reaction. The reaction solution was analyzed by thin layer chromatography (TLC) (thin-layer plate: silica gel G60 (Merck), developing solvent: ACN:water:TFA (66:33:1)). The radiochemical yield of the produced 1-$^{211}$At-4-carboxybenzene (Rf=0.81) was 87.5%. This result demonstrates that the method of radiolabelling an aryl compound of the present invention can be applied not only to boronophenylalanine but also to boronocarboxybenzene (carboxyphenylboronic acid).

Example 10 Glioma Cell Uptake Experiment

Figure 9:
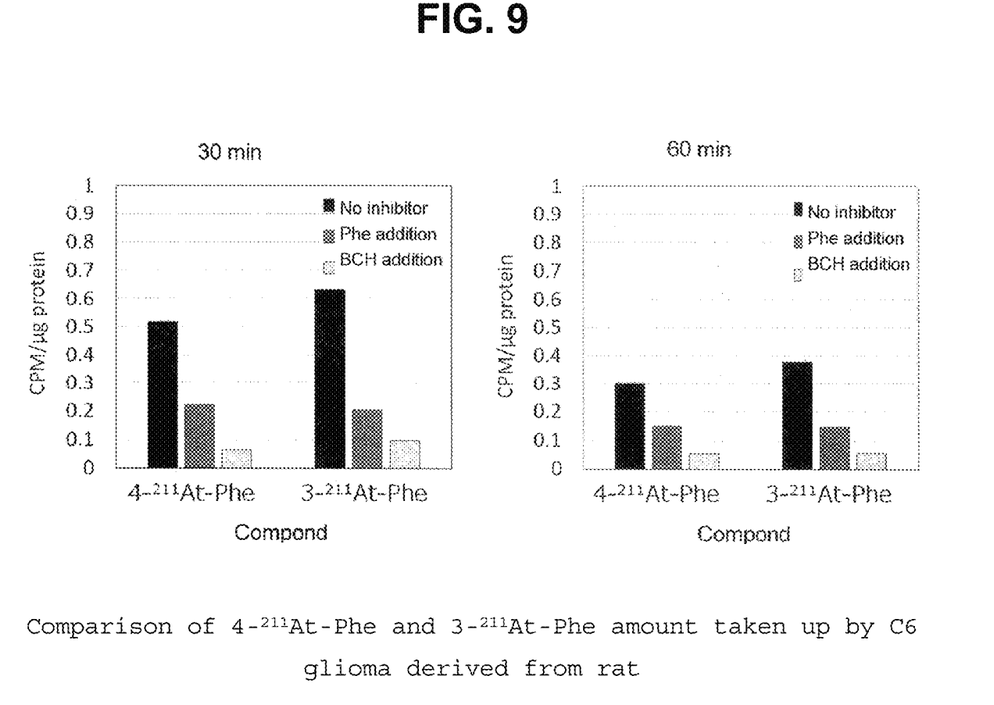
FIG. 9 shows comparison of 4-$^{211}$At-Phe or 3-$^{211}$At-Phe amount taken up by C6 glioma derived from rat in Example 10.

The concentration of the 4-211At-L-phenylalanine (4-$^{211}$At-Phe) solution prepared in Example 2 and the 3-$^{211}$At-D,L-phenylalanine (3-$^{211}$At-Phe) solution prepared in Example 7 were each adjusted to 5 MBq/2 mg·ml. C6 glioma cell derived from rat was seeded on each well of 24-well plate by 5×10$^5$ cells/well, is and the cells were used in the next day's experiment (cell number: about 1×10$^6$ cells/well). Before the experiment, the medium was replaced with an amino acid-free HBSS medium (0.5 ml/well). 4-$^{211}$At-Phe or 3-$^{211}$At-Phe was added to each well of the plate by 10 μl, and the wells were divided into three groups of inhibitor-free group, 1% Phe addition group (competitive inhibitor) and 100 mM BCH addition group (LAT1 inhibitor), and incubated at 37° C. for 30 minutes or 60 minutes. After the incubation, the culture solution was removed, and the cells were washed with PBS, and lysed, and the amount of radioactivity taken up intracellularly was measured. The results are shown in FIG. 9. 4-$^{211}$At-Phe and 3-$^{211}$At-Phe were both taken up by the cell, and the cell uptake of 3-$^{211}$At-Phe was slightly more than that of 4-$^{211}$At-Phe. Moreover, the cell uptake after 60 minutes was reduced, compared to that after 30 minutes. The competitive inhibitor (Phe) reduced the cell uptake of 4-$^{211}$At-Phe and 3-$^{211}$At-Phe to ½ to ⅓, and LAT1 inhibitor (BCH) reduced the cell uptake of 4-$^{211}$At-Phe and 3-$^{211}$At-Phe to ¼ to ⅛. That is to say, the results demonstrated that 4-$^{211}$At-Phe and 3-$^{211}$At-Phe were both specifically taken up by the cells via LAT1, and therefore, 4-$^{211}$At-Phe and 3-$^{211}$At-Phe can be expected to be applied to RI internal therapy for cancer. Especially, the cell uptake of 3-$^{211}$At-Phe was more than that of 4-$^{211}$At-Phe, and therefore, 3-211At-Phe can be further expected for the above-mentioned application.

Figure 10:
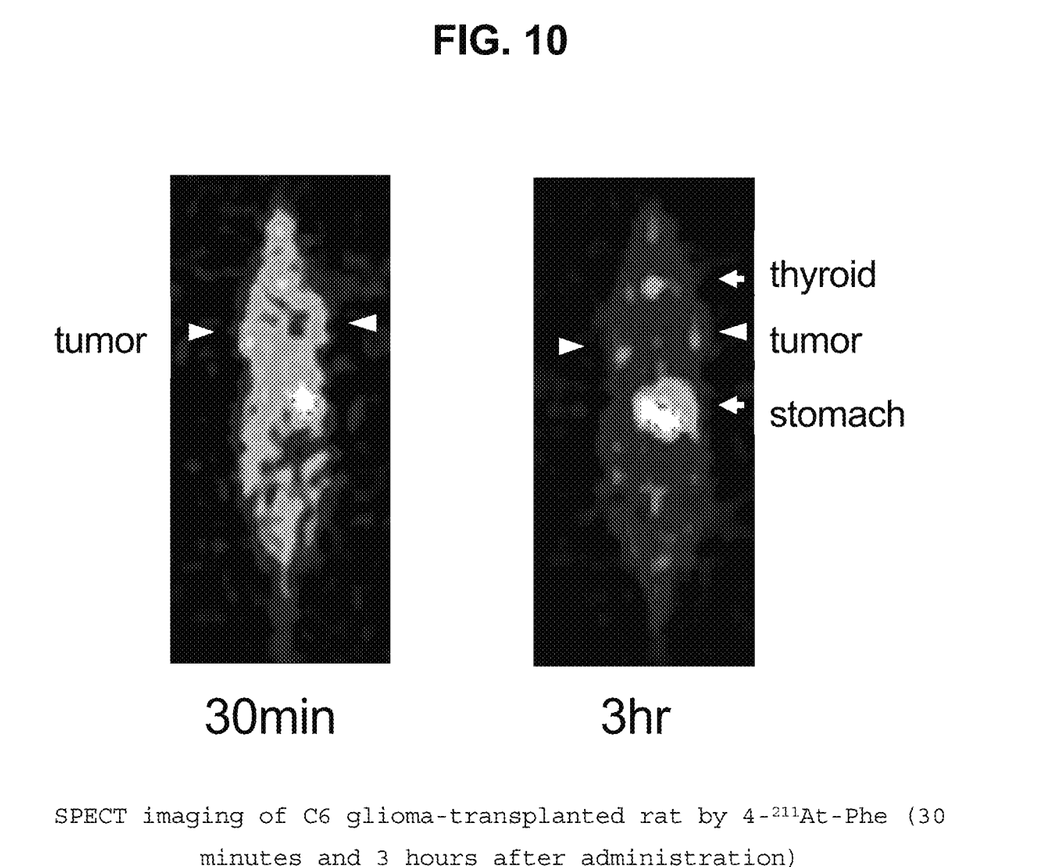
FIG. 10 shows SPECT imaging of C6 glioma-transplanted rat by 4-$^{211}$At-Phe in Example 11 (30 minutes and 3 hours after administration).

Example 11 SPECT Imaging of C6 Glioma-Transplanted Rat by 4-$^{211}$At-L-phenylalanine The 4-$^{211}$At-L-phenylalanine (4-$^{211}$At-Phe) (1 MBq) prepared in Example 2 was administered to the tail vein of the glioma-transplanted rat, and the rat was imaged by SPECT camera (E-cam, Siemens). The SPECT images 30 minutes and 3 hours after the administration are shown in FIG. 10. In both images, the is accumulation of 4-$^{211}$At-Phe in the tumor (both flanks, indicated by arrows in the figure) was observed. Therefore, 4-$^{211}$At-Phe can be expected to be applied to RI internal therapy or diagnosis for cancer.

INDUSTRIAL APPLICABILITY

According to the production method of the present invention, the radiolabeled aryl compound (I) can be easily produced in a high radiochemical yield in a short time, and the formulation can be carried out immediately after the labelling. Therefore, the labelling and formulation can be easily carried out in a short time, and a sequence of processes from preparation of a radionuclide to RI internal therapy or diagnosis for cancer can be promptly carried out.

This application is based on patent application No. 2017-151632 filed on Aug. 4, 2017 in Japan, the contents of which are encompassed in full herein.

The invention claimed is:

1. A method of producing a radiolabeled aryl drug compound represented by formula (I):

Ar—X      (I)

wherein
Ar is a $C_{6-14}$ aryl group optionally having substituent(s), and
X is $^{123}$I, $^{124}$I, $^{125}$I or $^{131}$I,
or a salt thereof, which comprises reacting an aryl boronic acid compound represented by formula (II):

Ar—Y      (II)

wherein
Ar is as defined above, and
Y is a borono group (—B(OH)$_2$) or an ester group thereof,
or a salt thereof, with a radionuclide selected from the group consisting of $^{123}$I, $^{124}$I, $^{125}$I and $^{131}$I, in the presence of an oxidizing agent selected from the group consisting of N-bromosuccinimide and N-chlorosuccinimide, in water, in an organic solvent-free system.

2. The method according to claim 1, wherein the reaction is carried out at room temperature.

3. The method according to claim 1, wherein Y is a borono group (—B(OH)$_2$).

4. The method according to claim 1, wherein the substituent of the $C_{6-14}$ aryl group optionally having substituent(s) represented by Ar is a group capable of binding specifically to a target molecule.

5. The method according to claim 4, wherein the target molecule is an antigen, a transporter, a receptor, an enzyme or a gene, which target molecule is specifically expressed or overexpressed in a cancer cell.

6. The method according to claim 1, wherein Ar is a group represented by formula:

wherein
R² is a halogen atom,
m is 0 or 1,
n is 0 or an integer of 1 to 4, and
* is a binding site to X or Y, or
a peptide comprising a structure represented by formula:

wherein
each ⁓ represents the remainder of the peptide,
R² is a halogen atom,
m is 0 or 1,
n is 0 or an integer of 1 to 4, and
* is a binding site to X or Y.

7. The method according to claim 1, wherein Ar is a group represented by formula:

wherein
R³ is a hydrogen atom or a halogen atom,
m is 0 or 1, and
* is a binding site to X or Y, or
a peptide comprising a structure represented by formula:

or wherein
each ⁓ represents the remainder of the peptide,
R³ is a hydrogen atom or a halogen atom,
m is 0 or 1, and
* is a binding site to X or Y.

8. The method according to claim 1, wherein the aryl boronic acid compound represented by formula (II) is 4-boronophenylalanine, 4-borono-2-fluorophenylalanine or 3-boronophenylalanine.

* * * * *